US012711256B2

(12) United States Patent
Johnson et al.

(10) Patent No.: US 12,711,256 B2
(45) Date of Patent: Aug. 18, 2026

(54) APPARATUS AND METHODS FOR MODIFYING A UNION FILE SYSTEM USING SUPERCOPY CONTROL

(71) Applicant: INTERNATIONAL BUSINESS MACHINES CORPORATION, Armonk, NY (US)

(72) Inventors: Neil Alan Johnson, Cornwall, NY (US); Brad Stilwell, Poughkeepsie, NY (US); Marie R Buzzetti, Pleasant Valley, NY (US); Kershaw S. Mehta, Poughkeepsie, NY (US); Daniel Acevedo, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 18/411,129

(22) Filed: Jan. 12, 2024

(65) Prior Publication Data

US 2025/0232048 A1 Jul. 17, 2025

(51) Int. Cl.
*G06F 21/62* (2013.01)
*G06F 16/16* (2019.01)

(52) U.S. Cl.
CPC .......... *G06F 21/6209* (2013.01); *G06F 16/16* (2019.01)

(58) Field of Classification Search
CPC ...... G06F 21/6209; G06F 16/16; G06F 21/62; G06F 21/6227; G06F 21/00; G06F 21/6218; G06F 3/0622; G06F 9/445; G06F 17/30; G06F 12/14; G06F 21/55
USPC .......................................................... 726/28
See application file for complete search history.

(56) References Cited

U.S. PATENT DOCUMENTS 6,678,828 B1 * 1/2004 Pham .................. H04L 67/1097 726/4
7,197,516 B1 * 3/2007 Hipp ....................... G06F 16/10
7,917,751 B2 * 3/2011 Keohane ................. G06F 16/10 713/153
8,898,101 B2 * 11/2014 Bone ....................... G06F 16/10 706/50
9,852,137 B2 12/2017 Mann et al.
10,162,722 B2 12/2018 Lin et al.
10,558,818 B2 * 2/2020 Goyal ................. G06F 21/6227
(Continued)

OTHER PUBLICATIONS https://docs.kernel.org/maintainer/index.html (Year: 2014).*
(Continued)

*Primary Examiner* — Sargon N Nano
(74) *Attorney, Agent, or Firm* — Onyx IP Group

(57) ABSTRACT

Methods, apparatus and products for modifying a union file system are described herein. In some aspects, a method and apparatus include a processing device and memory, wherein the memory stores computer program instructions that, when executed, cause the processing device to receive a user request to modify a file in a union file system and in response to a user having permission to read the file, copy up the file from a lower layer read-only file system of the union file system to an upper layer file system that is writeable, to produce a copied-up file. The copied-up file is modified in the upper layer file system based on a new file in the request. The new file in some implementations is a file to replace a file in the UFS or a file that is added to a directory in the UFS.

19 Claims, 7 Drawing Sheets

(56) References Cited

U.S. PATENT DOCUMENTS

| | | | | |
|---|---|---|---|---|
| 2012/0284254 | A1* | 11/2012 | Garg | G06F 16/532 707/E17.017 |
| 2013/0205091 | A1* | 8/2013 | Liang | G06F 12/0855 711/130 |
| 2013/0311730 | A1* | 11/2013 | Slattery | G06F 12/00 711/156 |
| 2014/0115292 | A1* | 4/2014 | Mclachlan | G06F 21/14 711/170 |
| 2014/0222627 | A1* | 8/2014 | Kukreja | G06Q 30/0643 705/27.2 |
| 2014/0281018 | A1* | 9/2014 | Waclawsky | H04L 47/27 709/235 |
| 2015/0039512 | A1* | 2/2015 | Adjaoute | G06Q 20/384 705/44 |
| 2015/0234780 | A1* | 8/2015 | Raghunathan | G06F 18/2411 708/446 |
| 2015/0350299 | A1* | 12/2015 | Pineas | H04W 4/50 709/203 |
| 2021/0075855 | A1 | 3/2021 | Spillane et al. | |
| 2021/0149657 | A1* | 5/2021 | Fitzer | G06F 8/61 |

OTHER PUBLICATIONS

Versatility and Unix Semantics in a Fan-Out Unification File System Charles P. Wright, Jay Dave, Puja Gupta, Harikesavan Krishnan, Erez Zadok, and Mohammad Nayyer Zubair, Stony Brook University Technical Report FSL-04-01b-Nov. 9, 2004 (Year: 2004).*

* cited by examiner

APPARATUS AND METHODS FOR MODIFYING A UNION FILE SYSTEM USING SUPERCOPY CONTROL

BACKGROUND

The present disclosure relates to methods, apparatus, and products for modifying a union file system.

SUMMARY

According to embodiments of the present disclosure, various methods, apparatus and products for modifying a union file system are described herein. In some aspects, a method and apparatus include a processing device and memory, wherein the memory stores computer program instructions that, when executed, cause the processing device to receive a user request to modify a file in a union file system and in response to a user having permission to read the file, copy up the file from a lower layer read-only file system of the union file system to an upper layer file system that is writeable, to produce a copied-up file. The copied-up file is modified in the upper layer file system based on a new file in the request. The new file in some implementations is a file to replace a file in the UFS or a file that is added to a directory in the UFS.

DETAILED DESCRIPTION

Figure 1:
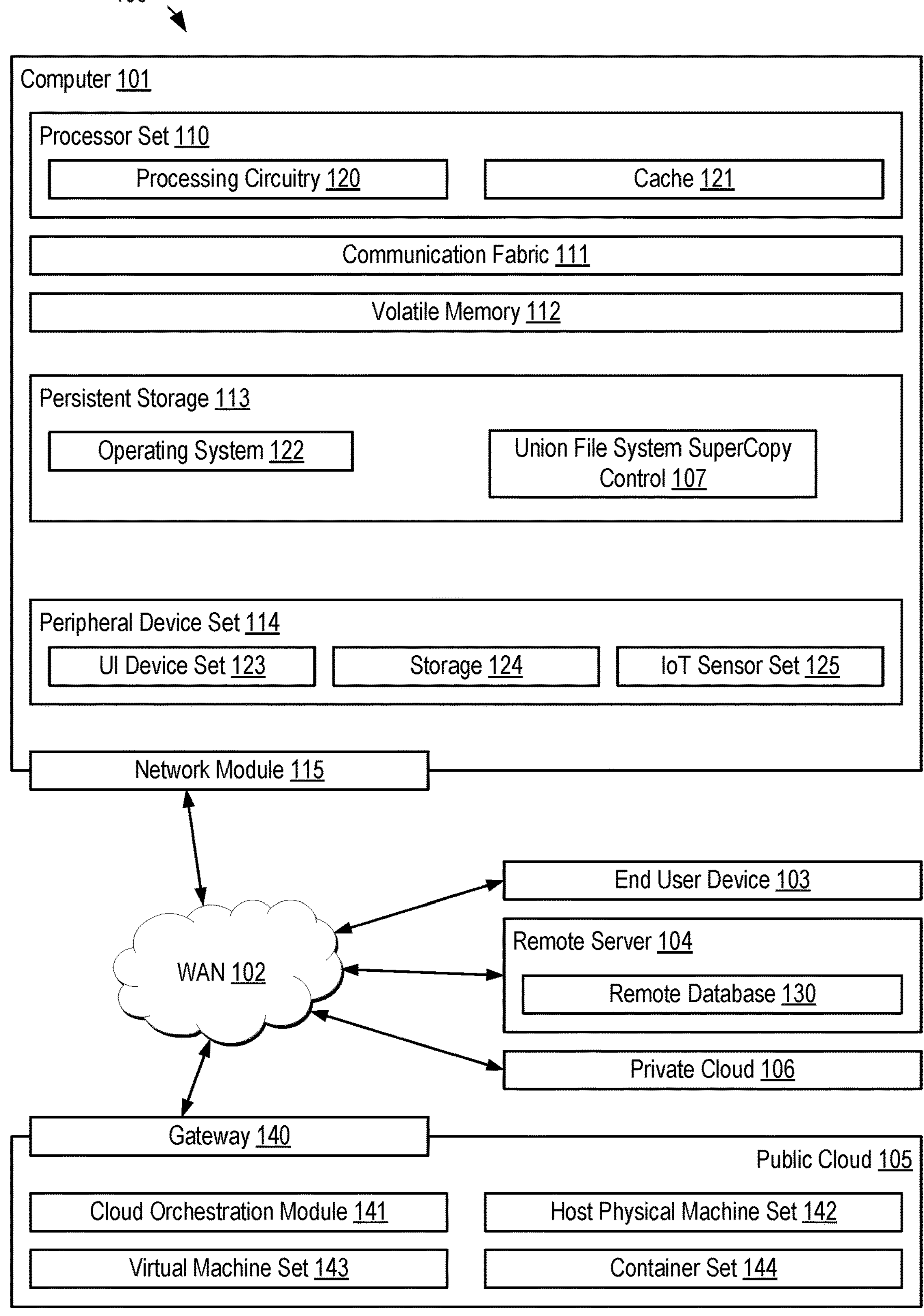
FIG. 1 sets forth an example computing environment according to aspects of the present disclosure.

A union file system (UFS) provides a merged view of two or more directories. This merged view is obtained by accessing the mount point of the union file system. Union file systems basically take different file systems and create a union of their contents with an upper layer (e.g., the top most layer) superseding any similar files found in the file systems. A union file system allows files and directories of separate file systems, known as branches, to be transparently overlaid, forming a single coherent file system. Contents of directories which have the same path within the merged branches will be seen together in a single merged directory, within the new, virtual file system. As an example, given two directory hierarchies, the root directory of the UFS file system is a level higher than the root levels of the two directory hierarchies. When a union directory is created, directories with the same name are merged. When files are encountered with the same name, only one will exist. Union file systems are used extensively by containers.

Union file systems are typically made up of one or more read-only lower layer file systems, also referred to a back layer, and a writable upper layer file system, also referred to as front layer. An administrator can create the lower layer(s) and set the file attributes that require administrator privileges. The lower layer file system is read-only and shared by multiple users. With union file systems, containers can use a single file system hierarchy without having to make multiple copies, which saves on disk space. In some systems, each container has its own UFS. Containers are executable units of software in which application code is packaged along with its libraries and dependencies, in common ways so that the code can be run anywhere, whether it be on desktop or the cloud. Containers share the machine operating system (OS) kernel, eliminating the need for a full OS instance per application and making container files small and easy on resources. Other possible uses of union file systems include creating an isolated environment to test a series of file changes and manipulations without affecting the existing file system hierarchy.

One desirable aspect of "docker containers" is that "container images" can be built by "normal" (also known as "rootless", uid!=0, not super) users. However, a normal user does not have the administrator privileges required to install software into a system. On Linux, for example, user namespaces play a major role in providing a virtualized container environment where the user is made to look like a superuser with the necessary administrator privileges without giving additional access to the host system. Providing a virtualized container environment on some operating system platforms is particularly challenging due to the unique way of managing users/security and due to the widespread use of file attributes that require administrator privileges.

As disclosed herein, a union file system has supercopy control for a user that allows filesystem operations to take place for containers that would typically require superuser permission. In some implementations, UFS supercopy control is used in conjunction with a container image layer provided by an administrator. In this container environment for building images, the user will not have a uid=0, but the UFS supercopy option will allow filesystem operations to take place that would typically require a superuser (such as an administrator or other user with super user privileges) without invoking a superuser. For example, rather than use user namespaces to provide an environment that a normal user can administer, a new UFS supercopy mode is disclosed. A new UFS supercopy attribute is used as the container root filesystem. Containers may be used as part of building images. Containers may also be used to run workloads. The disclosed supercopy operation is employed for building images. The action build verses run that determines when supercopy should be used.

By way of example, a UFS filesystem on IBM z/OS® is made up of one or more read only lower layer file systems and a writable upper layer file system. An administrator on z/OS can create the lower layer(s) and set the file attributes that require administrator privileges (e.g. authorization program facility (APF) Authorized). The lower layer file system is shared by multiple users. Directories like/bin in that layer are only writable by the administrator. But, with the UFS supercopy mode disclosed herein, instead of rejecting a request to add a file to/bin like would previously be done, /bin is copied-up (i.e. created) in the upper directory and the file (e.g., with new executable code) is created there using a copy-on-write (COW) operation. The net effect is that a new directory layer is created in the upper directory exactly as if the user owned all the files in the lower directory. When modifying an existing file (instead of adding a file) in the UFS, the UFS supercopy overrides a current user's denial permission to modify a file and allows a user that is not a superuser to modify an existing file in the UFS even if the user permission to modify a file is currently set to not allow modification.

For example, in a conventional UFS, a modify request will invoke a check to determine if the user has permission to modify the file in question. This would be done using the permission bits associated with the file or by some other security mechanism. The modify operation would not proceed if the user does not have permission to modify the file and the operation would be rejected. As disclosed herein, instead of rejecting the operation for a user that does not have permission to modify a file in question, a UFS with supercopy control instead performs a check to determine if the user has permission to read the file in question; permission to write is ignored. When the user has permission to read, the modify operation is granted and the process proceeds to perform the copy-on-write.

Also, typically copy-on-write makes an exact copy. In the context of files, that would mean an exact copy of file data as well as file attributes such as owner and permission bits. As disclosed herein, however instead, file metadata in the copy-on-write copy of the file is not an exact copy of the original. File metadata in the copy is set to appropriately reflect the user's permission to modify the written file for subsequent modifications. For example, a copied file may have the owner set to the current user even though the original owner was different. And a copied file may grant the owner write permissions even though the original permissions did not. This allows the modify operation to proceed with the copied file as "normal".

With reference now to FIG. 1, FIG. 1 sets forth an example computing environment according to aspects of the present disclosure. Computing environment 100 contains an example of an environment for the execution of at least some of the computer code involved in performing the various methods described herein, such as code that provides a union file system supercopy control 107. In addition to the program code that provides union file system supercopy control 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code that provides union file system supercopy control 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored code such as code that provides union file system supercopy control 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The operating system 122 in some implementations, includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
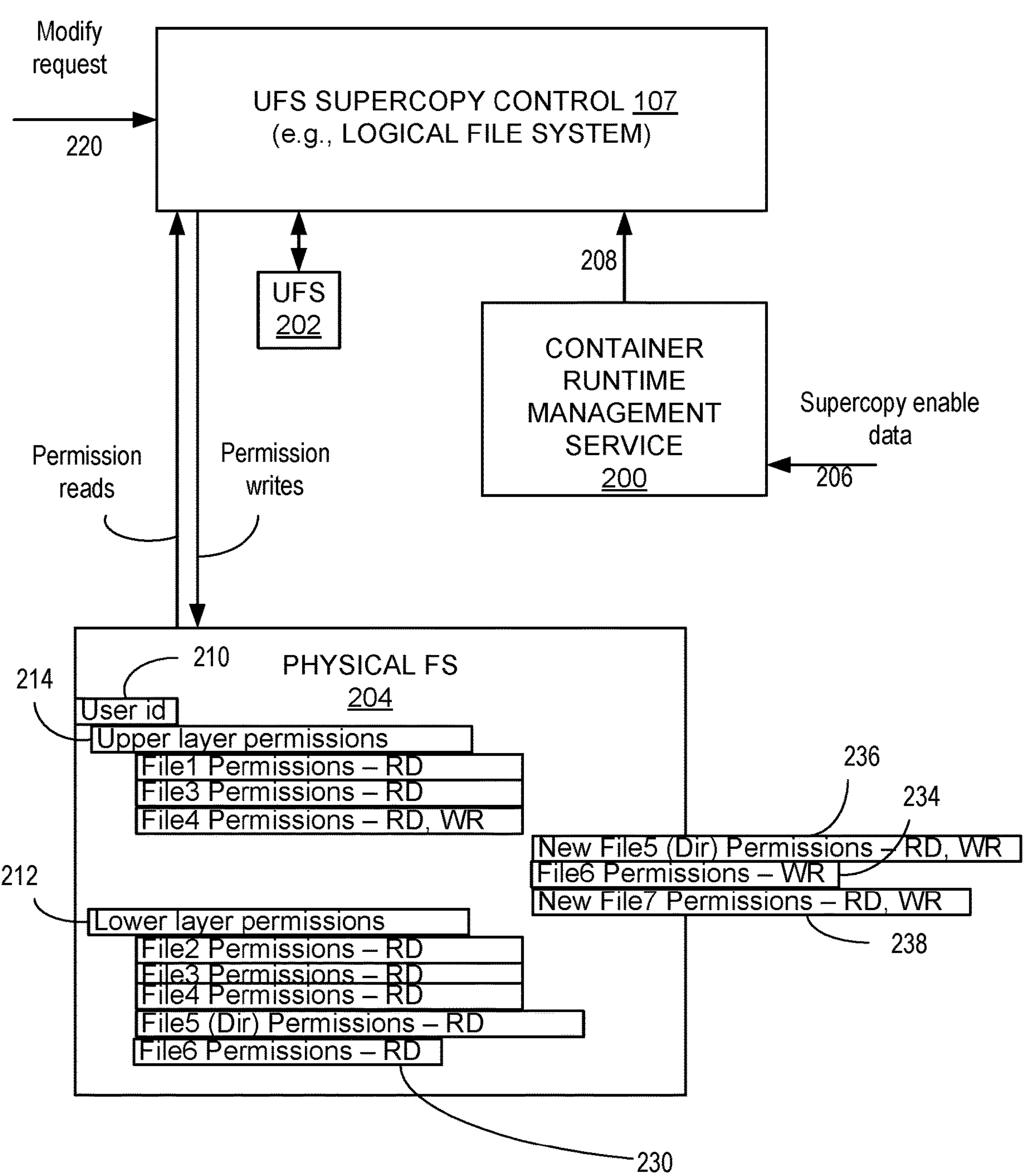
FIG. 2 sets forth an example operating system that provides a union file system with a user supercopy operation according to aspects of the present disclosure.

Referring to FIG. 2, FIG. 2 sets forth sets forth an example computer, such as a mainframe or other suitable device, that provides a UFS such as an z/OS® environment. However, the operations described herein may be implemented in any suitable environment and may be incorporated into any suitable component as desired. In this example, the operating system 122 provides a union file system (UFS) with a user supercopy option tied to a container root file system. As used herein, a directory is considered a type of file. As used herein a modify request includes a request to create a file in a UFS and/or modify an existing file in a UFS. In this example, the operating system 122 includes code that when executed operates to provide UFS supercopy control 107, code that provides container runtime management service 200 and code that provides a physical file system 204. The container runtime management service 200 in one example is a service that manages where file system layers are for containers and provides union mount directory information for a logical file system that manages UFSs for the containers. For example, the UFS supercopy control 107 communicates with the logical file system that carries out conventional union file operations as part of generating union file systems 202 for the containers. In this example, the UFS supercopy control 107 provides a supercopy option for file system management of files for a UFS. Supercopy enable data 206 in one example is an attribute of a container that indicates to the UFS supercopy control 107 that files (including directories) for a particular container should be managed using the supercopy control 107 operation as disclosed herein. When the user builds a container (versus run), the supercopy operation is employed.

When UFS supercopy has been enabled for a container, the container runtime management service 200 provides container attributes 208 including supercopy enable data 206 to notify the UFS with supercopy control 107 that the supercopy mode is enabled for that container. Supercopy enabled/disabled data is provided as well as the directories/layers/filesystems used for the upper/lower layers. When the supercopy mode is selected for a container image, as further provided below, the union file system with supercopy control 107 modifies files in the union file system for the container through a copy-on-write operation, in response to verifying that the user has permission to read the file even though the user is not a superuser (e.g., does not have administrator level permissions).

In this example, the physical file system 204 includes for the UFS 202, on a per user basis such as identified through a user identifier 210, file use permissions such as read and write permissions (including directory permissions and file owner) on an upper layer file system basis and on a lower layer file system basis. In some implementations, the data is in the form of file system paths with permission attributes set for each file and directory in a path. As shown, the lower layer permissions 212 for files and directories are read-only. In this example, File3 and File4 have read-only permission, File5 which is a directory has read-only permission, and File6 has read-only permission. Upper layer permissions 214 show File4 has read and write permission, and File6 has read-only permission. The file system permissions are provided by the image which is built using the processing described herein. During operation, the permissions are checked as part of file system management operations including by the UFS supercopy control 107 as further provided below.

Figure 3:
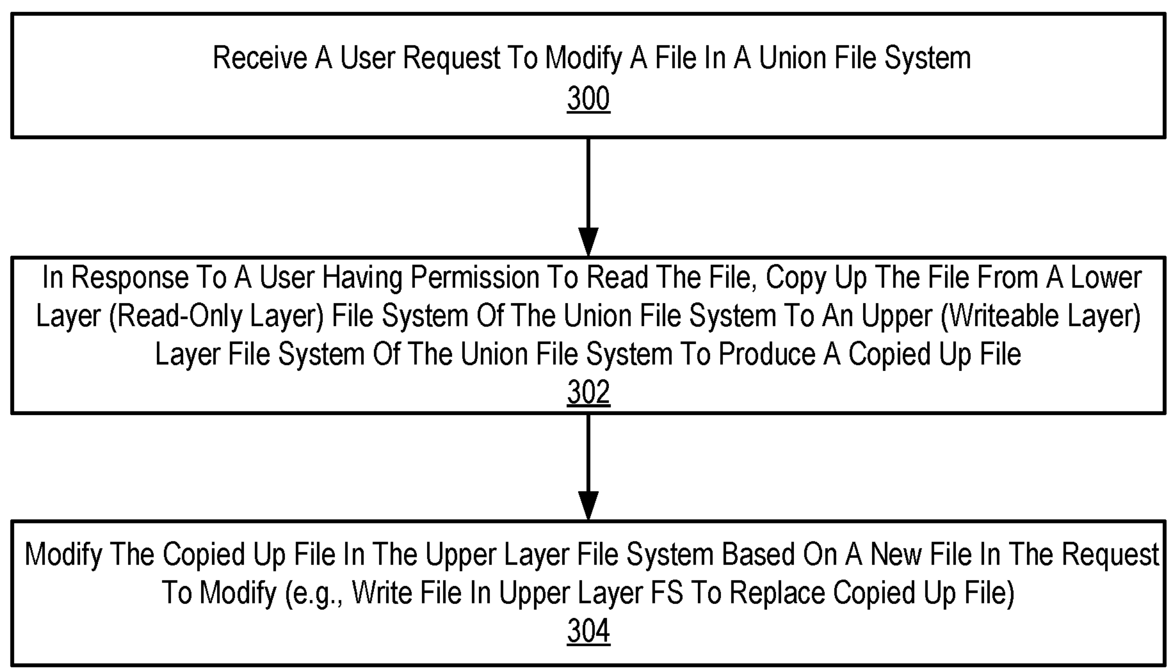
FIG. 3 sets forth a flowchart of an example process for modifying a union file system according to aspects of the present disclosure.

Referring also to FIG. 3, FIG. 3 sets forth a flowchart of an example method for modifying a union file system, such as by the UFS supercopy control 107. However, it will be recognized that any suitable component can carry out the operations described herein and that the operations may be performed in any suitable order. As shown in block 300, the method includes receiving a modify request 220 to modify a file in a union file system. In this example the request is referred to as a modify request and is part of a user context. In this example the modify request includes a path of a file to be modified and the associated new file to replace the current file in the filesystem (in the upper layer) or the file to add to the filesystem (add to the upper layer). Modification can include a request to add (create) a file to a directory and/or replace a current file in a UFS with a new file in the modify request. As used herein replace includes one or more of adding data to the file, deleting data from the file, modifying file metadata and replacing the entire file. When the file is a directory, modifying includes one or more directory merging operations. As shown in block 302, the method includes in response to a user having permission to read the file identified in the modify request 220, the supercopy control 107 copies up the file from a lower layer file system of the UFS to an upper layer file system of the UFS to produce a copied-up file which is then written over with the file from the modify request 220. For example, as shown in block 304 the method includes modifying the copied-up file in the upper layer file system based on a new file in the request to modify 220. The supercopy control 107 writes the new file from the request in the upper layer file system to replace the copied-up file. However as further described, an exact copy is not performed in some implementations. Instead, user permissions and owner designations (file permission metadata) are changed in the final file to allow subsequent writing to the file by the user.

Figure 4:
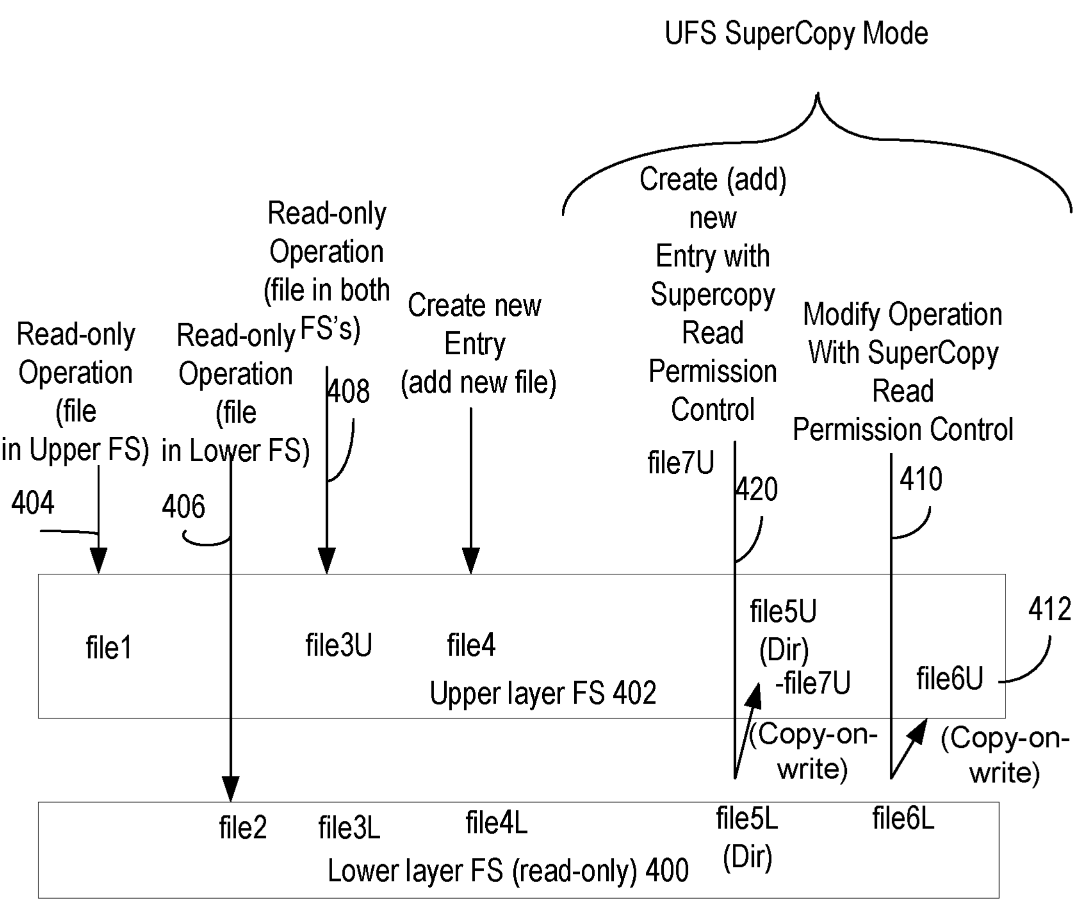
FIG. 4 sets forth a diagram illustrating modifying a union file system in a supercopy mode according to aspects of the present disclosure.
Figure 5:
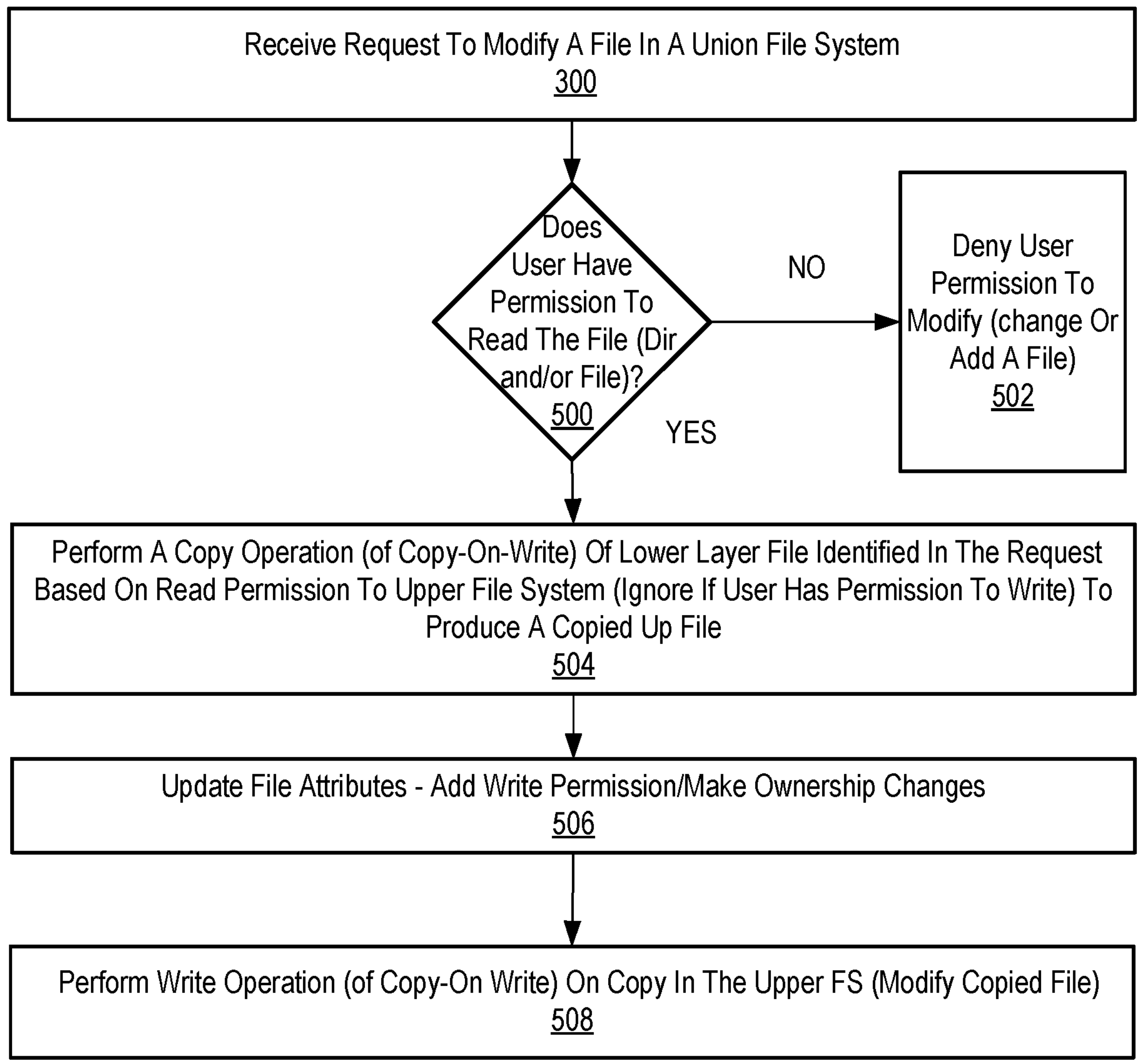
FIG. 5 sets forth a more detailed flowchart of an example process for modifying a union file system according to aspects of the present disclosure according to aspects of the present disclosure.

Referring to FIG. 2, FIG. 4 and FIG. 5, FIG. 4 diagrammatically illustrates modifying a union file system in a supercopy mode and FIG. 5 is a flowchart of an example process for modifying a union file system that will be described with reference to FIGS. 2 and 4. As shown in FIG. 4, a lower layer file system 400 which is a read only layer, includes file2, file3, file5 and file6. An upper layer file system 402 which is writable, includes file1, a copy of file3, shown as file3U and file 4. As shown by arrow 404, a read-only operation is provided as shown by the permission information in the physical file system 204, read operation 406 is a read only to file 2 in the lower layer, read only operation 408 is allowed for both upper and lower layers as shown by the permission information in the physical file system 204.

Referring to FIG. 5, as shown in block 500, when the supercopy mode is enabled, the method includes, in response to the user request to modify a file, in this example the request is to modify file6, the method includes checking user permission data, such as the permission data 230 in the physical file system 204, that is associated with the file identified in the modify request 220. If the user does not have permission to read the file, as shown in block 502, the modify request is denied. However, in this example the user has permission to read the file6. Therefore, as shown in block 504, the UFS supercopy control 107 performs a copy-on-write operation, in this example a copy operation of the lower layer file6L to the upper file system as shown by arrow 410 is done. A copied-up file6 is produced. This is done based on the read permission data 230. The copying up of the file6 from the lower layer file system to the upper layer file system is done by performing a copy-on-write operation in the union file system that copies the file from the lower layer file system to the upper layer file system based on the user having permission to read the file.

As shown in block 506, the method includes updating file attributes of file 6 to add a write permission and make ownership changes if needed. For example, file metadata 234 is changed that is associated with the copied-up file in the physical file system. For example, if the permission was for read-only, the permission is changed to a write permission. The file permission data for the final file is updated to reflect user permission to allow subsequent user modifications of the new file in the upper layer file. A new file is the final file or directory that results after the modification request is completed. As shown in block 508 as part of the copy-on-write operation, the copied-up file is modified by writing the new file (the file in the modify request) to replace the copied-up file. In this example, file6U is the new file that replaces the copied-up file file6L and file metadata 234 is changed with new permission data that indicates that the file6U is writable.

Figures 6A, 6B:
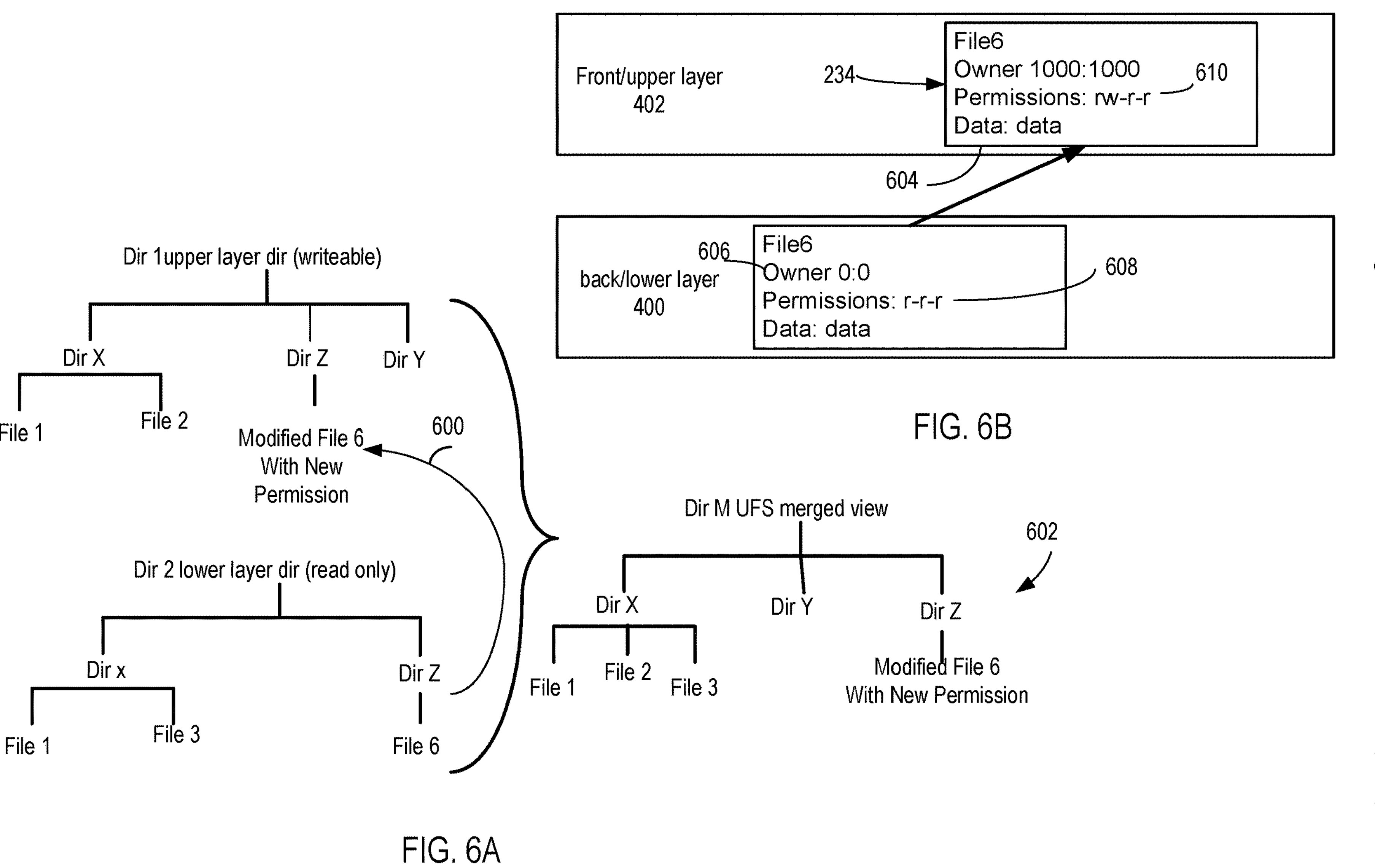
FIG. 6A sets forth another example diagram illustrating modifying a union file system in a supercopy mode according to aspects of the present disclosure.
FIG. 6B is a diagram illustrating modifying a union file system in a supercopy mode by changing file permission and ownership data according to aspects of the present disclosure.

Referring to FIGS. 6A and 6B, FIG. 6A illustrates that directories Dir1 and Dir2 are merged and that union is accessed from the UFS mount point directory DirM. When the union is created, directories with the same name (DirX) are merged. When files are encountered with the same name (for example, DirX/file1), only one will exist. The directory that is specified in the mount parameter upper_layer_dir takes precedence over the directory that is specified in the lower_layer_dir option during path name resolution. In this example, Dir1 takes precedence and the version of File1 that is in the Dir1 directory will be shown in the UFS merge view 602. In this illustration, arrow 600 illustrates that an exact copy of File6 from lower layer Dir 2 is not kept and instead a modified File6 with updated permission metadata is stored in the physical file system.

For example, referring to FIG. 6B and also FIG. 4, as shown by arrow 410 (in FIG. 4), writing the new file (File6) to replace the copied-up file in the upper layer file system includes writing file contents shown as data 604 from the new file identified in the request and changing file metadata, such as data representing owner 606 and use permissions 608 associated with the copied-up file to reflect user permission 610 to allow subsequent user modification of the new file in the upper layer file system. The lower layer/back-filesystem 400 has a different owner because it is a filesystem that is shared by multiple users—user 1000, user 1001 . . . user n.

Figure 7:
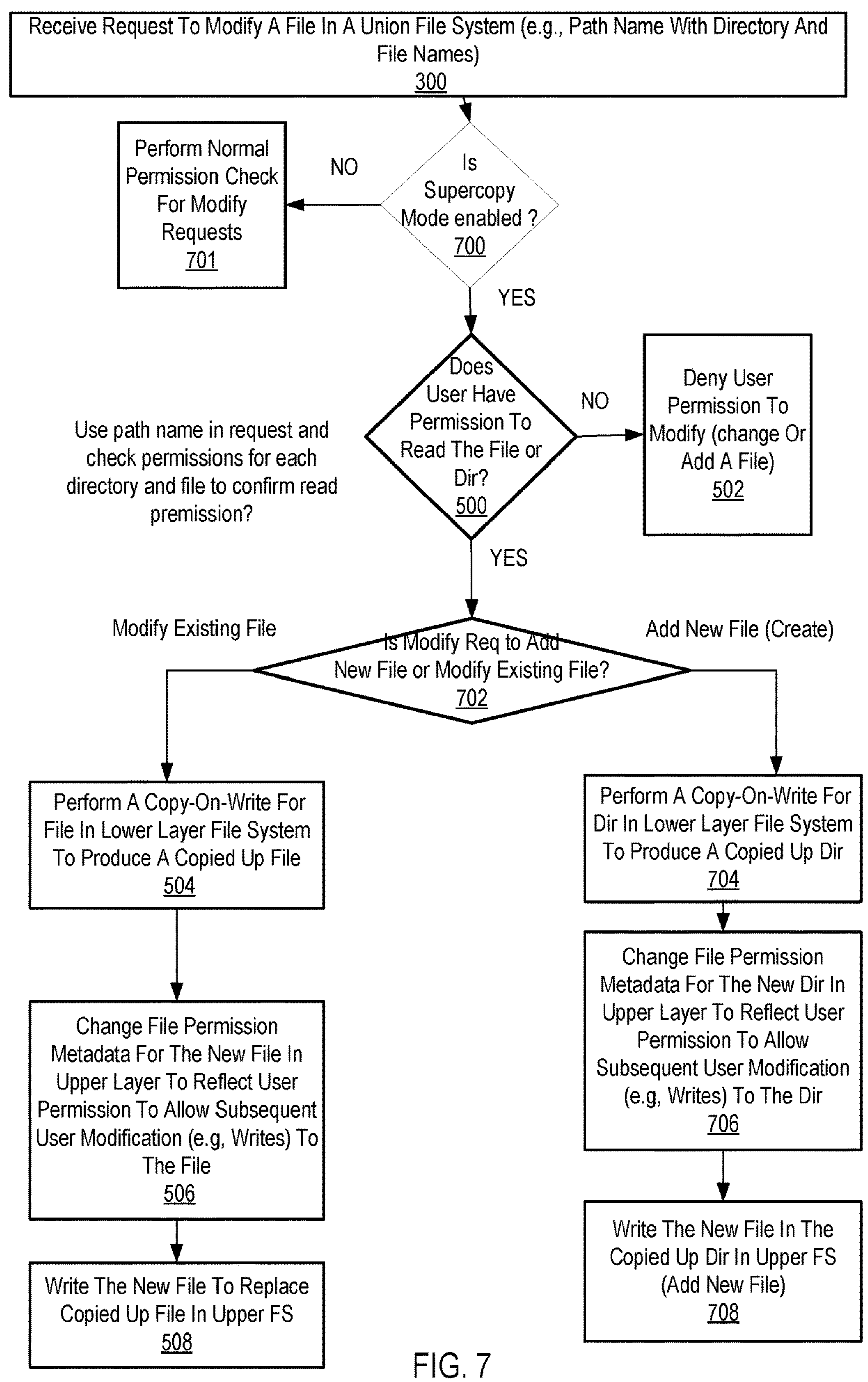
FIG. 7 sets forth a flowchart of an example process for modifying a union file system with a directory according to aspects of the present disclosure.

Referring to FIG. 7 as well as FIG. 2 and FIG. 4, FIG. 7 sets forth a flowchart of an example process for modifying a union file system with either a replacement file (the new file in the request) for one that is in the UFS or to add (create) a file (add the new file in the request). As shown in block 700, the method includes determining if the supercopy mode is enabled for a container. A user could have some containers for image builds, which use the disclosed supercopy mode, and some that are for running workloads, which may not use supercopy. Determining if supercopy mode is enabled is done in one example by checking for supercopy attribute data 206 associated with the container from the container runtime management service 200. If supercopy mode has not been enabled for the container, as shown in block 701, the method includes performing normal permission checks for modify requests. However, when supercopy is enabled for the container (e.g., container build vs. container run), as shown in block 500, as previously described, the UFS supercopy control 107 system determines if the user has permission to read the file and directory(s) that is in the modify request.

In UFS supercopy mode, to create (add) a file, when the user has read permission to the corresponding directory, for example for a request having path: /Dir/File1, the new file is File1. A copy-on-write operation is used to create a new directory Dir in the upper layer and the new file File1 is written in the new directory. For example, when the modify request 220 is for adding a new file, such as path: /file5 (Dir)/file7, shown in FIG. 4 by arrow 420, the UFS supercopy control 107 as shown in block 704 performs a copy-on-write for the corresponding directory File5 that is in the request to produce a copied-up directory File5U. As shown in block 706, the method includes changing file permission metadata for the copied-up directory file5 (which is a new directory in the upper layer), shown as permission data 236 in FIG. 2, corresponding to file5U to be writable to allow subsequent user modifications to files in the directory. As shown in block 708 the method includes writing the new file (file7) in the upper layer in the copied-up directory (file5U). New file metadata for the new file (file7) shown as permission data 238 that include a write permission is stored for the file7U. For example, when the modify request includes a path name including the directory in the lower layer file system of the union file system and a new file to be created in the directory, in response to the user having permission to read the directory, the method includes copying up the directory in the lower layer file system to the upper layer file system, and modifying the copied-up file by writing the new file in the copied-up directory in the upper file system.

Among other technical benefits, a UFS provides a "supercopy" option that causes the UFS to copy-up with superuser-like behavior but for users that do not have superuser control privileges. A "normal" user can mount such a UFS with lower layers like that from the superuser. As needed, the UFS supercopy control copies-up read-only files/directories as if done by the "normal" user. In some implementations, the UFS supercopy function can be implemented in a container management product. In some implementations an operating system provides administrator privileges, in a container environment for creating software container images, to a user that does not have administrator privileges to install software in a container image.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving a user request, of a user, to modify a file in a union file system, wherein the user request includes a new file;

determining, based on receiving the user request, whether the user has permission to read the file in a lower layer file system of the union file system without determining whether the user has permission to write the file in the union file system;

denying the user request to modify the file when the user does not have permission to read the file in the lower layer file system without determining whether the user has permission to write the file in the union file system, wherein determining that the user does not have permission to read the file in the lower layer file system prevents the file from being copied from the lower layer file system of the union file system to an upper layer file system of the union file system;

copying up the file from the lower layer file system of the union file system to the upper layer file system of the union file system to produce a copied-up file when the user has permission to read the file in the lower layer file system;

modifying metadata associated with the copied-up file to indicate that the user is an owner of the copied-up file in order to grant, the user, permission to modify the copied-up file in the upper layer file system;

causing a container, associated with the union file system, to be managed in accordance with the user being granted the permission to modify the copied-up file in the upper layer file system; and modifying the copied-up file in the upper layer file system based on the new file included in the user request.

2. The method of claim 1 wherein copying up the file from the lower layer file system to the upper layer file system comprises performing a copy-on-write operation in the union file system that copies the file from the lower layer file system to the upper layer file system based on the user having permission to read the file and modifying the copied-up file by writing the new file to replace the copied-up file.

3. The method of claim 1 comprising setting a supercopy mode for the union file system that modifies the file in the union file system through a copy-on-write operation, in response to verifying that the user has permission to read the file.

4. The method of claim 1, further comprising:

writing file contents from the new file identified in the user request to replace the copied-up file in the upper file system; and modifying the metadata associated with the copied-up file to reflect user permission to allow subsequent user modification of the new file in the upper layer file system.

5. The method of claim 4 wherein modifying the metadata associated with the copied-up file in a physical file system to reflect user permission to allow subsequent user modification of the new file in the upper layer file system.

6. The method of claim 1 wherein the user request includes a path name including a directory in the lower layer file system of the union file system and the new file to be created in the directory, and wherein the method includes, in response to the user having permission to read the directory, copying up the directory in the lower layer file system to the upper layer file system, and wherein modifying the copied-up directory comprises writing the new file in the copied-up directory in the upper file system.

7. An apparatus comprising:

a processing device; and memory operatively coupled to the processing device, wherein the memory stores computer program instructions that, when executed, cause the processing device to:

receive a user request, of a user, to modify a file in a union file system, wherein the user request includes a new file;

determine, based on receiving the user request, whether the user has permission to read the file in a lower layer file system of the union file system without determining whether the user has permission to write the file in the union file system;

based on determining that the user has permission to read the file in the lower layer file system, copy up the file from the lower layer file system of the union file system to an upper layer file system of the union file system to produce a copied-up file without determining whether the user has permission to write the file in the union file system, wherein the file is prevented from being copied from the lower layer file system to the upper layer file system when the user does not have permission to read the file in the lower layer file system;

modify metadata associated with the copied-up file to indicate that the user is an owner of the copied-up file;

cause a container, associated with the union file system, to be managed in accordance with the user being granted permission to modify the copied-up file in the upper layer file system; and modify the copied-up file in the upper layer file system based on the new file included in the user request.

8. The apparatus of claim 7 wherein the memory stores computer program instructions that, when executed, cause the processing device to: copy up the file from the lower layer file system to the upper layer file system by performing a copy-on-write operation in the union file system that copies the file from the lower layer file system to the upper layer file system based on the user having permission to read the file and modifies the copied-up file by writing the new file to replace the copied-up file.

9. The apparatus of claim 7 wherein the memory stores computer program instructions that, when executed, cause the processing device to: set a supercopy mode for the union file system that modifies the file in the union file system through a copy-on-write operation, in response to verifying that the user has permission to read the file.

10. The apparatus of claim 7 wherein the memory stores computer program instructions that, when executed, cause the processing device to: write the new file to replace the copied-up file in the upper layer file system by writing file contents from the new file identified in the user request and modify the metadata associated with the copied-up file to reflect user permission to allow subsequent user modification of the new file in the upper layer file system.

11. The apparatus of claim 7 wherein the memory stores computer program instructions that, when executed, cause the processing device to:

modify the metadata associated with the copied-up file in a physical file system to reflect user permission to allow subsequent user modification of the new file in the upper layer file system.

12. The apparatus of claim 7 wherein the user request includes a path name including a directory in the lower layer file system of the union file system and the new file to be created in the directory, and wherein the memory stores computer program instructions that, when executed, cause the processing device to: in response to the user having permission to read the file, copy up the directory in the lower layer file system to the upper layer file system, and modify the copied-up directory by writing the new file in the copied-up directory in the upper file system.

13. A computer program product comprising a computer readable storage medium, wherein the computer readable storage medium comprises computer program instructions that, when executed:

receive a user request, of a user, to modify a file in a union file system, wherein the user request includes a new file;

determine, based on receiving the user request, whether the user has permission to read the file in a lower layer file system of the union file system without determining whether the user has permission to write the file in the union file system;

deny the user request to modify the file when the user does not have permission to read the file in the lower layer file system without determining whether the user has permission to write the file in the union file system, wherein determining that the user does not have permission to read the file in the lower layer file system prevents the file from being copied from the lower layer file system of the union file system to an upper layer file system of the union file system;

copy up the file from the lower layer file system of the union file system to the upper layer file system of the union file system to produce a copied-up file when the user does have permission to read the file in the lower layer file system, without determining whether the user has permission to write the file in the union file system;

modify metadata in the copied-up file to indicate that the user is an owner of the copied-up file in order to grant, the user, permission to modify the copied-up file in the upper layer file system;

cause a container, associated with the union file system, to be managed in accordance with the user being granted the permission to modify the copied-up file in the upper layer file system; and modify the copied-up file in the upper layer file system based on the new file in the user request.

14. The computer program product of claim 13 wherein the computer readable storage medium comprises computer program instructions that, when executed:

copy up the file from the lower layer file system to the upper layer file system by performing a copy-on-write operation in the union file system that copies the file from the lower layer file system to the upper layer file system based on the user having permission to read the file; and modify the copied-up file by writing the new file to replace the copied-up file.

15. The computer program product of claim 13 wherein the computer readable storage medium comprises computer program instructions that, when executed:

set a supercopy mode for the union file system that modifies the file in the union file system through a copy-on-write operation, in response to verifying that the user has permission to read the file.

16. The computer program product of claim 13 wherein the computer readable storage medium comprises computer program instructions that, when executed:

write the new file to replace the copied-up file in the upper layer file system by writing file contents from the new file identified in the request; and modify the metadata associated with the copied-up file to reflect user permission to allow subsequent user modification of the new file in the upper layer file system.

17. The computer program product of claim 13 wherein the computer readable storage medium comprises computer program instructions that, when executed:

receive the user request that includes a path name including a directory in the lower layer file system of the union file system and the new file to be created in the directory;

in response to the user having permission to read the file, copy up the directory in the lower layer file system to the upper layer file system;

modify the copied-up directory by writing the new file in the copied-up directory in the upper file system; and modify the metadata associated with the file written to the upper file system to reflect user permission to allow subsequent user modification of the file in the upper layer file system.

18. The computer program product of claim 13 wherein the computer readable storage medium comprises computer program instructions that, when executed:

write the new file to replace the copied-up file in the upper layer file system.

19. The computer program product of claim 13 wherein the computer readable storage medium comprises computer program instructions that, when executed:

modify the metadata associated with the copied-up file in a physical file system to reflect user permission to allow subsequent user modification of the new file in the upper layer file system.

* * * * *